(12) United States Patent
Nishikata (10) Patent No.: US 12,503,116 B2
(45) Date of Patent: Dec. 23, 2025

(54) LANE CHANGE SUPPORT DEVICE

(71) Applicant: TOYOTA JIDOSHA KABUSHIKI KAISHA, Toyota (JP)

(72) Inventor: Takahiro Nishikata, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 36 days.

(21) Appl. No.: 18/769,606

(22) Filed: Jul. 11, 2024

(65) Prior Publication Data

US 2025/0115242 A1    Apr. 10, 2025

(30) Foreign Application Priority Data

Oct. 5, 2023  (JP) .................................. 2023-173333

(51) Int. Cl.
*B60W 30/18*  (2012.01)
*B60W 50/08*  (2020.01)

(52) U.S. Cl.
CPC ...... *B60W 30/18163* (2013.01); *B60W 50/08* (2013.01); *B60W 2520/10* (2013.01); *B60W 2554/80* (2020.02); *B60W 2720/106* (2013.01)

(58) Field of Classification Search
CPC ........... B60W 30/18163; B60W 50/08; B60W 2520/10; B60W 2554/80
See application file for complete search history.

(56) References Cited

U.S. PATENT DOCUMENTS

| | | | | |
|---|---|---|---|---|
| 2021/0269040 | A1* | 9/2021 | Kurokawa | ......... B62D 15/0265 |
| 2022/0063627 | A1* | 3/2022 | Hashimoto | ............ B60Q 1/346 |
| 2022/0203992 | A1* | 6/2022 | Taniguchi | .............. G08G 1/167 |
| 2023/0303077 | A1* | 9/2023 | Kato | ...................... B60Q 1/346 |
| 2023/0311889 | A1* | 10/2023 | Kato | ...................... B60W 50/14 |
| | | | | 701/26 |
| 2023/0356741 | A1* | 11/2023 | Hayakawa | ...... B60W 30/18163 |
| 2024/0383480 | A1* | 11/2024 | Fayad | ............. B60W 30/18163 |
| 2024/0400057 | A1* | 12/2024 | Fayad | ................. B60W 30/143 |
| 2025/0289434 | A1* | 9/2025 | Fayad | ............. B60W 30/18163 |

FOREIGN PATENT DOCUMENTS

JP          2021-076983 A          5/2021

* cited by examiner

*Primary Examiner* — George C Jin
(74) *Attorney, Agent, or Firm* — SoraIP, Inc.

(57) ABSTRACT

A lane change support device determines whether or not the vehicle can change the lane ahead of the other vehicle by determining whether or not the sum of the distance traveled by the vehicle to move forward by the lane change by the predetermined preceding distance with respect to the other vehicle traveling ahead of the lane change destination lane, and the distance traveled by the vehicle during the predetermined allowance time is equal to or less than the distance from the current position of the vehicle to the branching point, or whether or not the sum of the time for the vehicle to move forward by the lane change by the predetermined preceding distance with respect to the other vehicle and the predetermined allowance time is equal to or less than the time at which the vehicle reaches the branching point.

5 Claims, 4 Drawing Sheets

LANE CHANGE SUPPORT DEVICE

CROSS-REFERENCE TO RELATED APPLICATION

This application claims priority to Japanese Patent Application No. 2023-173333 filed on Oct. 5, 2023, incorporated herein by reference in its entirety.

BACKGROUND

1. Technical Field

The present disclosure relates to a lane change support device for a vehicle such as an automobile.

2. Description of Related Art

As one of lane change support devices, there is known a lane change support device that determines whether the host vehicle can make a lane change in a situation where the host vehicle needs to make a lane change and there is another vehicle traveling in a lane as a lane change destination.

For example, Japanese Unexamined Patent Application Publication No. 2021-76983 (JP 2021-76983 A) describes a lane change support device that determines whether the host vehicle can make a lane change in consideration of the distance to a branching point of a lane when it is desired to make a lane change before the host vehicle reaches the branching point, so that a lane change is not made to a location behind another vehicle that is slower than the host vehicle, even if the distance to the branching point is sufficiently long. According to the lane change support device of this type, it is possible to suppress a lane change being made to a location behind another vehicle that is slower than the host vehicle, even if the distance to the branching point is sufficiently long.

SUMMARY

In the conventional lane change support device such as the device described in JP 2021-76983 A, however, it is occasionally determined that a lane change cannot be made, even if a lane change can be made, depending on the positional relationship between the host vehicle and another vehicle traveling in the lane as the lane change destination.

The present disclosure determines whether a lane change can be made based on the distance to a branching point and the positional relationship between the host vehicle and another vehicle. The present disclosure provides a lane change support device improved so as to be able to reduce the possibility that it is determined that a lane change cannot be made, even if a lane change can be made.

An aspect of the present disclosure provides a lane change support device (100) including: a target information acquisition device (18) that acquires information on a target around a host vehicle (102); a vehicle speed information acquisition device (vehicle state sensor 70) that acquires information on a vehicle speed of the host vehicle; and a control unit (driving support ECU 10) configured to estimate an inter-vehicle distance (Lip) between the host vehicle and another vehicle (112) traveling ahead in a lane (110) as a lane change destination and a relative vehicle speed (Vr) of the host vehicle with respect to the other vehicle based on the information acquired by the target information acquisition device.

The control unit (driving support ECU 10) is configured to acquire information on a distance (Lbp) from a present location of the host vehicle to a branching point of a lane, and determine whether the host vehicle is able to make a lane change to a location ahead of the other vehicle (S60) by making one of a first determination and a second determination based on the vehicle speed (Vo) of the host vehicle, the inter-vehicle distance (Lip), the relative vehicle speed (Vr), and the distance from the present location of the host vehicle to the branching point of the lane, the first determination being a determination as to whether a sum of a distance $((Lip+Lif)/Vr*Vo)$ to be traveled by the host vehicle to make a lane change and move to a location a predetermined preceding distance (Lif) ahead of the other vehicle and a distance $(Ta*Vo)$ to be traveled by the host vehicle during a predetermined allowance time (Ta) is equal to or less than a distance (Lbp) from the present location of the host vehicle to the branching point, and the second determination being a determination as to whether a sum of a time $((Lip+Lif)/Vr)$ for the host vehicle to make a lane change and move to a location the predetermined preceding distance (Lif) ahead of the other vehicle and a predetermined allowance time (Ta) is equal to or less than a time (Lbp/Vo) for the host vehicle to reach the branching point.

According to the above configuration, one of the first and second determinations is made. The first determination is a determination as to whether a sum of a distance to be traveled by the host vehicle to make a lane change and move to a location a predetermined preceding distance ahead of the other vehicle and a distance to be traveled by the host vehicle during a predetermined allowance time Ta is equal to or less than a distance from the present location of the host vehicle to the branching point The second determination is a determination as to whether a sum of a time for the host vehicle to make a lane change and move to a location the predetermined preceding distance ahead of the other vehicle and a predetermined allowance time is equal to or less than a time for the host vehicle to reach the branching point.

Thus, it is possible to determine whether the host vehicle can make a lane change to a location ahead of the other vehicle traveling ahead in the lane as the lane change destination by making one of the first and second determinations. Therefore, it is possible to reduce the possibility that it is determined that a lane change cannot be made, even if a lane change can be made to a location ahead of the other vehicle.

In one aspect of the present disclosure, the control unit (driving support ECU 10) may be configured to, when a negative determination is made in the one of the first and second determinations, specify deceleration (Gxp) that is allowable for the host vehicle to make a lane change and move to a location a predetermined following distance (Lib) behind the other vehicle, and determine whether the host vehicle is able to make a lane change to a location behind the other vehicle (S80) by making one of a third determination and a fourth determination, the third determination being a determination as to whether a sum of a distance $(Vr^2/(2Gxp))$ by which the host vehicle approaches the other vehicle before the relative vehicle speed becomes zero by the host vehicle decelerating at the allowable deceleration and the predetermined following distance (Lib) is equal to or less than the inter-vehicle distance (Lip), and the fourth determination being a determination as to whether a sum of half a time $(Vr/(2Gxp))$ before the relative vehicle speed becomes zero by the host vehicle decelerating at the allowable deceleration and a time (Lib/Vr) required for the host vehicle to travel the predetermined following distance is equal to or less than a time (Lip/Vr) for the host vehicle to catch up with the other vehicle.

In another aspect of the present disclosure, the control unit (driving support ECU 10) may be configured to, when a negative determination is made in the one of the third and fourth determinations, make a fifth determination (S100) that is a determination as to whether the host vehicle is able to make a lane change and move to a location the predetermined preceding distance (Lif) ahead of the other vehicle before the host vehicle reaches the branching point by accelerating the host vehicle.

In still another aspect of the present disclosure, the control unit (driving support ECU 10) may be configured to, when a negative determination is made in the fifth determination (S100), leave to a driver a determination as to whether the host vehicle is able to make a lane change and move to a location ahead of the other vehicle (S120).

In still another aspect of the present disclosure, the control unit (driving support ECU 10) may be configured to specify the allowable deceleration according to the vehicle speed (Vo) of the host vehicle (S80).

In the above description, other objects, other features, and accompanying advantages of the present disclosure will be readily understood from the following description of an embodiment of the present disclosure made with reference to the drawings.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a lane change support device according to an embodiment of the present disclosure will be described in detail with reference to the accompanying drawings.

Figure 1:
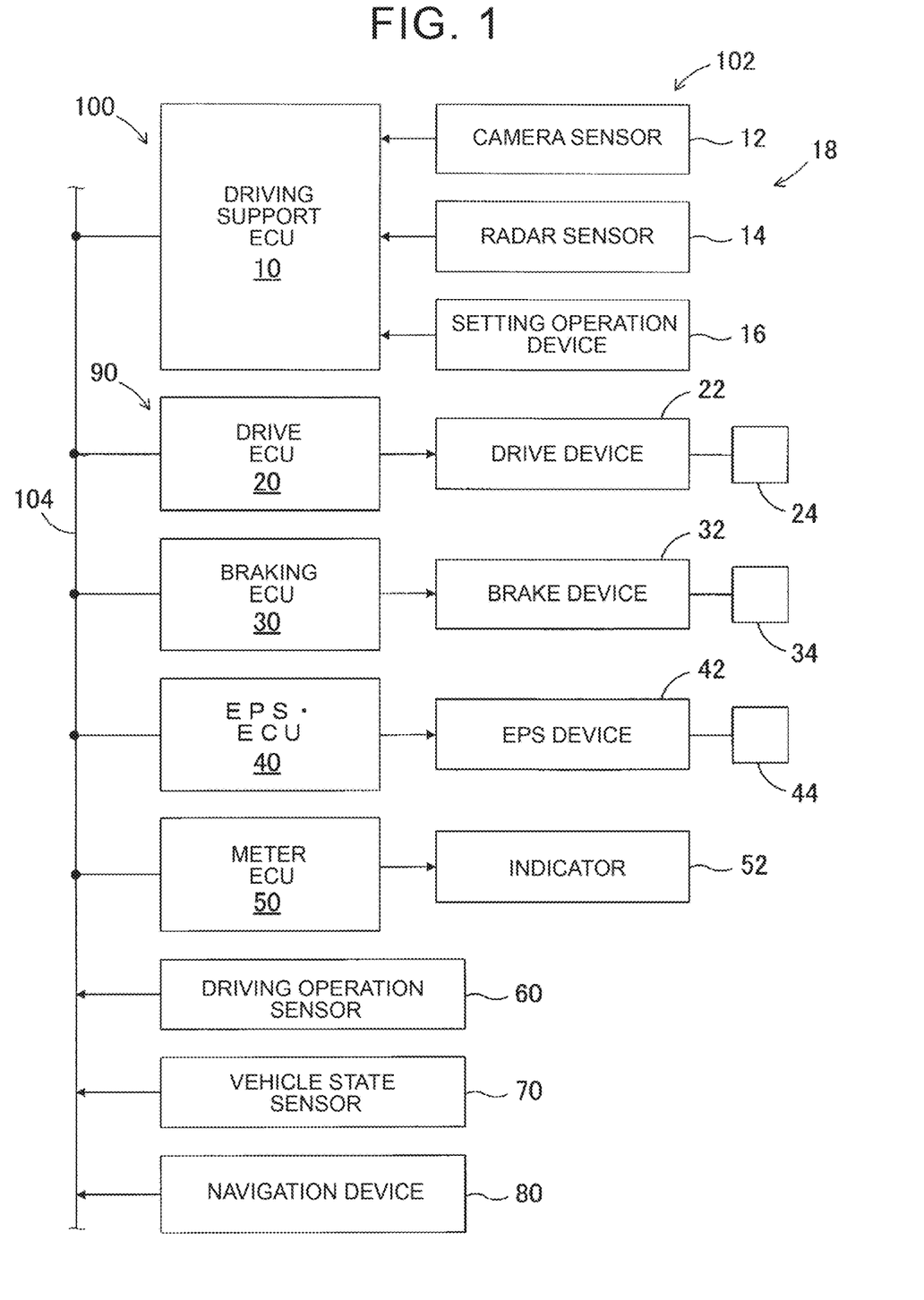
FIG. 1 is a schematic configuration diagram illustrating a lane change support device according to an embodiment.

As shown in FIG. 1, a lane change support device 100 according to an embodiment of the present disclosure is applied to vehicles 102 and includes a driving support Electronic Control Unit (ECU) 10. The vehicle 102 is a vehicle capable of automated driving, and includes a drive ECU 20, a braking ECU 30, an electric power steering ECU 40, and a meter ECU 50. In the following explanation, the electric power steering is referred to as an EPS.

A microcomputer of each ECU includes a central processing unit (CPU), a read-only memory (ROM), a random access memory (RAM), a readable and writable non-volatile memory (N/M), an interface (I/F), and the like. The CPU realizes various functions by executing instructions (programs, routines) stored in the ROM. Furthermore, these ECU are connected to each other in a data-exchangeable manner via a Controller Area Network (CAN) 104. Therefore, detected values of sensors (including switches) connected to a specific ECU are transmitted to other ECUs as well.

The driving support ECU 10 is a central control device that performs driving assistance control such as lane change assistance control and lane keeping control. In an embodiment, the driving support ECU 10 cooperates with other ECU to perform lane change assistance control of the vehicles 102, as will be described further below.

A camera sensor 12, a radar sensor 14, and a setting operation device 16 are connected to the driving support ECU 10. The camera sensor 12 and radar sensor 14 each include a plurality of camera devices and a plurality of radar devices. The camera sensor 12 and the radar sensor 14 function as a target information acquisition device 18 that acquires target information around the vehicle 102.

Each camera device of the camera sensor 12 includes a camera unit that captures an image of the surroundings of the vehicle 102, and a recognition unit that analyzes image data obtained by capturing an image by the camera unit and recognizes a target such as a white line of a road or another vehicle, although not shown in the drawing. The recognition unit supplies information about the recognized target to the driving support ECU 10 at predetermined intervals.

Each radar device of the radar sensor 14 includes a radar transceiver and a signal processor (not shown). The radar transmitting/receiving unit emits a radio wave (hereinafter, referred to as "millimeter wave") in a millimeter wave band, and receives a millimeter wave (that is, a reflected wave) reflected by a three-dimensional object (for example, another vehicle, a bicycle, or the like) existing in a radiation range. The signal processor supplies information indicating a distance between the host vehicle and the three-dimensional object, a relative speed between the host vehicle and the three-dimensional object, a relative position (direction) of the three-dimensional object with respect to the host vehicle, and the like to the driving support ECU 10 at predetermined time intervals on the basis of a phase difference between the transmitted millimeter wave and the received reflected wave, an attenuation level of the reflected wave, a time period from the transmission of the millimeter wave to the reception of the reflected wave, and the like. Incidentally, in lieu of the radar sensor 14, or in addition to the radar sensor 14, Light Detection and Ranging (LiDAR) may be used.

The setting operation device 16 is provided at a position that can be operated by a driver, such as a steering wheel (not shown in FIG. 1), and is operated by the driver. Although not shown in FIG. 1, the setting operation device 16 includes a lane change support switch. As described later, the driving support ECU 10 starts the lane change assistance control when the lane change assistance switch is on and a predetermined condition to be described later is satisfied.

A drive device 22 that accelerates the vehicles 102 by applying a driving force to the driving wheels 24 is connected to the drive ECU 20. The drive ECU 20 normally controls the drive device 22 such that a driving force generated by the drive device 22 changes in accordance with a driving operation by the driver, and controls the drive device 22 based on a command signal when the drive ECU 20 receives the command signal from the driving support ECU 10.

A braking device 32 is connected to the braking ECU 30 to decelerate the vehicles 102 by braking by applying a braking force to the wheels 34. The braking ECU 30 controls the braking device so that the braking force generated by the braking device 32 changes in response to a braking operation by the driver in a normal state. Upon receiving the command signal from the driving support ECU 10, the braking ECU 30 performs the automated braking by controlling the braking device 32 based on the command signal. When the braking force is applied to the wheels, a brake lamp (not shown in FIG. 1) is lit.

An EPS device 42 is connected to the EPS•ECU 40. EPS•ECU 40 controls EPS device 42 in a manner known in the art based on the steering torque Ts and the vehicle speed Vo detected by the driving operation sensor 60 and the vehicle state sensor 70 described later. EPS•ECU 40 controls the steering assist torque by controlling EPS device 42, thereby reducing the steering burden on the driver. EPS•ECU 40 can steer the steered wheels 44 as needed by controlling EPS device 42. Therefore, EPS•ECU 40 and EPS device 42 function as an automatic steering device that automatically steers steered wheels as needed.

As can be seen from the above explanation, the drive ECU 20, the drive device 22, the braking ECU 30, the braking device 32, EPS•ECU 40, and EPS device 42 function as a travel control device 90 that controls travel of the vehicle 102 such as braking and turning.

The meter ECU 50 is connected with a touch panel type indicator 52 that displays a state of control by the driving support ECU 10 and the like. The indicator 52 may be, for example, a multi-information display in which meters and various types of information are displayed, or may be a display of the navigation device 80 described later. As will be described later, when receiving a signal from the driving support ECU 10, the indicator 52 displays the status of the lane change assistance control.

The driving operation sensor 60 and the vehicle state sensor 70 are connected to the CAN 104. Information detected by the driving operation sensor 60 and the vehicle state sensor 70 (hereinafter referred to as sensor information) is transmitted to the CAN 104. The sensor information transmitted to the CAN 104 can be appropriately used in each ECU. Note that the sensor information may be information of a sensor connected to a specific ECU, and may be transmitted from the specific ECU to the CAN 104.

The driving operation sensor 60 includes a driving operation amount sensor for detecting an operation amount of the accelerator pedal, a braking operation amount sensor for detecting a pedaling force with respect to the master cylinder pressure or the brake pedal, and the like. Further, the driving operation sensor 60 includes a steering angle sensor that detects the steering angle θ, a steering torque sensor that detects the steering torque Ts, and the like. Further, the driving operation sensor 60 includes a turn lever that is operated when the driver desires to change the lane.

The vehicle state sensor 70 includes a vehicle speed sensor that detects a vehicle speed Vo of the vehicle 102. The vehicle state sensor 70 includes a longitudinal acceleration sensor that detects acceleration in the longitudinal direction of the vehicle. The vehicle state sensor 70 includes a lateral acceleration sensor that detects lateral acceleration of the vehicle. The vehicle state sensor 70 includes a yaw rate sensor that detects a yaw rate of the vehicle.

In addition, a navigation device 80 is also connected to CAN 104. The navigation device 80 includes a global positioning system (GPS) receiver that detects the position of the vehicle 102, a storage device that stores map information and road information, and a communication device that acquires the latest information of the map information and the road information from the outside. The navigation device 80 functions as a device for acquiring information about the current position of the vehicle 102, and outputs a signal indicating the current position of the vehicle on the map to the driving support ECU 10. Further, when the destination is input, the navigation device 80 determines a target route from the current location of the vehicle 102 to the destination, and guides the vehicle to travel along the target route. In particular, the navigation device 80 displays on the indicator 52 that a lane change is required when there is a branch point in front of the vehicle and a lane change is required in front of the branch point for the vehicle to travel along the target route. The navigation device 80 displays on the indicator 52 that a lane change is required, notifies the driver, and notifies the driving support ECU 10.

Figure 2:
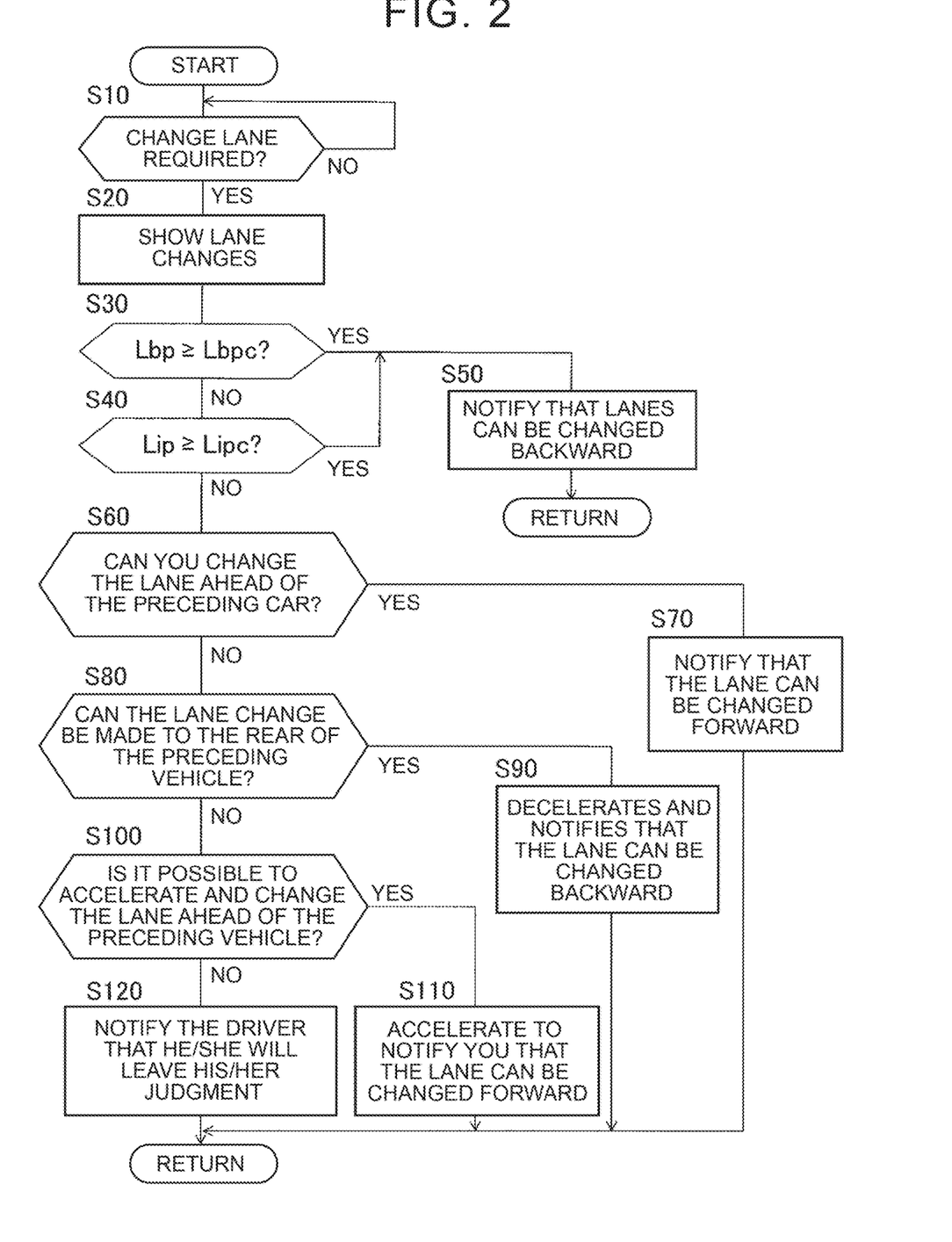
FIG. 2 is a flowchart corresponding to the lane change mode determination program in the embodiment.

In the embodiment, ROM of the driving support ECU 10 stores a lane change mode determination program corresponding to the flow chart shown in FIG. 2. Further, in the embodiment, ROM of the driving support ECU 10 stores a lane change control program corresponding to the flow chart shown in FIG. 3. Therefore, in the embodiment, the lane change assistance control is performed by the control of the lane change mode determination and the lane change control.

Lane Change Mode Determination

Next, lane change mode determination in the embodiment will be described with reference to the flowchart shown in FIG. 2. The lane change mode determination according to the flow chart shown in FIG. 2 is repeatedly executed at predetermined intervals by CPU of the driving support ECU 10 in a situation where the target route to the destination is set by the navigation device 80.

First, in S10, CPU determines whether or not the lane change needs to be performed in front of the branch point on the basis of the relation between the lane on which the host vehicle should travel and the current lane after passing through the branch point which is in the middle of the target route to the destination and is closest to the current location of the host vehicle 102. When a negative determination is made, CPU repeatedly executes S10, and when an affirmative determination is made, the control proceeds to S20.

In S20, CPU outputs a command signal to the meter ECU 50 to indicate that a lane change needs to be performed on the indicator 52.

Figure 5:
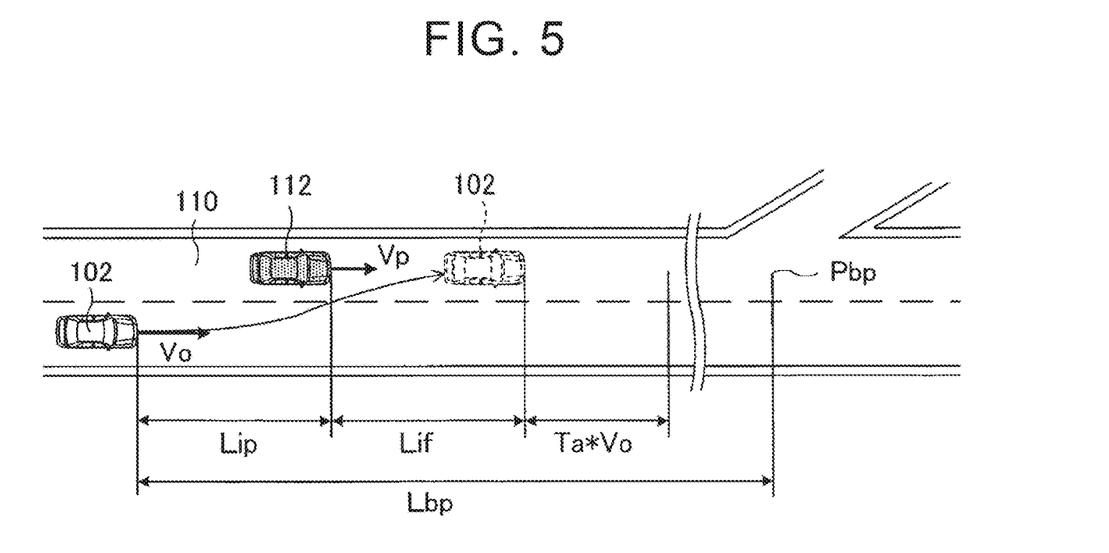
FIG. 5 is a diagram illustrating a method of determining whether or not a lane can be changed without accelerating or decelerating a lane ahead of another vehicle traveling ahead of a lane of a lane change destination without reaching a branch point of a lane.

In S30, CPU asks the navigation device 80 to obtain a distance Lbp [m] from the current position of the host vehicle 102 to the branch point Pbp requiring lane change, as shown in FIG. 5. Further, CPU determines whether the distance Lbp is greater than or equal to the reference distance Lbpc. CPU advances the present control to S50 when an affirmative determination is made, and advances the present control to S40 when a negative determination is made.

In S40, as illustrated in FIG. 5, CPU estimates the inter-vehicle distance Lip [m] between the host vehicle 102 and the other vehicle 112 traveling ahead of the lane 110 of the lane change destination. Further, CPU determines whether the inter-vehicle distance Lip is greater than or equal to the reference inter-vehicle distance Lipc (positive constant). CPU advances the present control to S60 when a negative determination is made, and advances the present control to S50 when an affirmative determination is made.

In S50, CPU notifies the routine of the lane change control by storing in RAM that the lane can be changed without accelerating or decelerating to the rear of the other vehicle 112 traveling ahead of the lane 110 of the lane change destination, and displays the notification on the indicator 52.

In S60, CPU performs one of the first and second determinations described below to determine whether or not the lane can be changed prior to reaching the branch point of the lane without accelerating or decelerating forward of the other vehicle 112 traveling ahead of the lane 110 of the lane change destination. CPU advances the present control to S80 when a negative determination is made, and advances the present control to S70 when an affirmative determination is made.

The first determination is a determination as to whether or not the sum of the distance traveled by the host vehicle to move forward by the lane change by the predetermined preceding distance with respect to the other vehicle and the distance traveled by the host vehicle during the predetermined allowance time is equal to or less than the distance from the current position of the host vehicle to the branching point. Further, the second determination is a determination as to whether or not the sum of the time for the host vehicle to move forward by the lane change by the predetermined preceding distance with respect to the other vehicle and the predetermined allowance time is equal to or less than the time until the host vehicle reaches the branch point.

As illustrated in FIG. 5, an Lip is an inter-vehicle distance between the other vehicle 112 traveling ahead of the lane 110 of the lane change destination and the host vehicle 102. When the host vehicle 102 completes the lane change, a vehicle-to-vehicle distance (predetermined preceding distance) to be secured with the other vehicle 112 is set as a Lif. A predetermined allowance time to be secured from the completion of lane change by the host vehicle 102 to the arrival at the branch point Pbp is set as a Ta, and a Vo-Vp of a difference between the relative speed of the host vehicle 102 with respect to the other vehicle 112, that is, the vehicle speed Vo of the host vehicle and the vehicle speed Vp of the other vehicle is set as a Vr. The inter-vehicle distance Lip and the like are estimated on the basis of the target information acquisition device 18.

The first determination may be, for example, a determination as to whether or not the following expression (1) is satisfied, and the second determination may be, for example, a determination as to whether or not the following expression (2) is satisfied.

$$\{(Lip + Lif)/Vr + Ta\} * Vo \leq Lbp \quad (1)$$

$$(Lip + Lif)/Vr + Ta \leq Lbp/Vo \quad (2)$$

In S70, CPU notifies the routine of the lane change control by storing in RAM that the lane can be changed without accelerating or decelerating ahead of the other vehicle 112 traveling ahead of the lane 110 of the lane change destination, and displays the notification on the indicator 52.

In S80, CPU specifies an allowable deceleration Gxp for the host vehicle 102 to move backward by lane change by a predetermined following distance with respect to the other vehicle 112. In this case, the allowable deceleration Gxp is calculated from the map shown in FIG. 4 based on the vehicle speed of the host vehicle so as to be able to be specified according to the vehicle speed Vo of the host vehicle, but may be a positive constant. Further, CPU performs one of the third and fourth determinations described below to determine whether the lane can be changed to the rear of the other vehicle 112 traveling ahead in the lane 110 that is the lane change destination by deceleration at an allowable deceleration. CPU advances the present control to S100 when a negative determination is made, and advances the present control to S90 when an affirmative determination is made.

The third determination is a determination as to whether or not the sum of the distance at which the own vehicle approaches the other vehicle until the relative speed becomes zero by decelerating at an allowable deceleration of the own vehicle and the predetermined following distance is equal to or less than the inter-vehicle distance between the own vehicle and the other vehicle. The fourth determination is a determination as to whether or not the sum of the time until the relative speed becomes zero by decelerating at an allowable deceleration of the host vehicle and the time required for the host vehicle to travel in a predetermined subsequent distance is equal to or less than the time until the host vehicle catches up with another vehicle.

Figure 6:
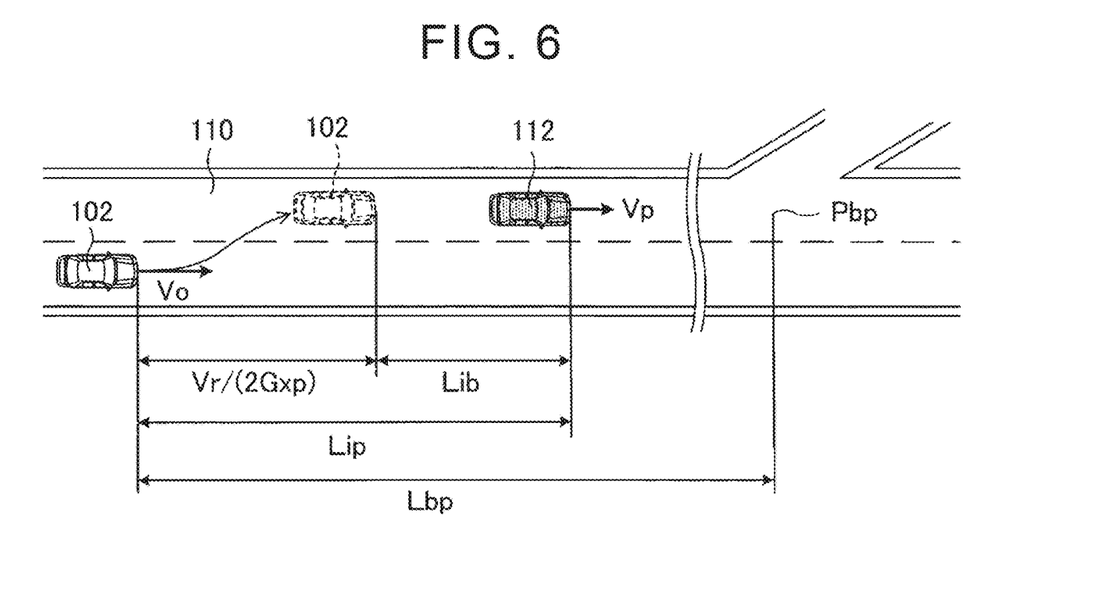
FIG. 6 is a diagram illustrating a procedure for determining whether or not a lane can be changed at a deceleration below an allowable deceleration toward the rear of another vehicle traveling ahead of a lane at a lane change destination.

As illustrated in FIG. 6, a predetermined following distance, that is, an inter-vehicle distance (a predetermined following distance) desired to be secured between the host vehicle 102 and the other vehicle 112 when the lane change is completed is set as a Lib. The time required until the host vehicle decelerates and the relative speed Vr becomes zero is Vr/Gxp, and the average relative speed until the host vehicle decelerates and the relative speed Vr becomes zero is Vr/2. Therefore, the distance Lap at which the host vehicle approaches the other vehicle before the host vehicle decelerates and the relative speed Vr becomes zero is expressed by expression (A) below.

$$Lap = (Vr/Gxp) * (Vr/2) \quad (A)$$
$$= Vr^2/(2Gxp)$$

Therefore, the third determination may be, for example, a determination as to whether or not the following expression (3) is satisfied, and the fourth determination may be, for example, a determination as to whether or not the following expression (4) is satisfied.

$$Vr^2/(2Gxp) + Lib \leq Lip \quad (3)$$

$$Vr/(2Gxp) + Lib/Vr \leq Lip/Vr \quad (4)$$

In S90, CPU stores in RAM that the lane can be changed by decelerating at an allowable deceleration Gxdp to the rear of the other vehicle 112 traveling ahead of the lane 110 of the lane change destination. By storing the fact that the lane can be changed in RAM, the routine of the lane change control is notified and displayed on the indicator 52.

In S100, CPU makes a fifth determination as to whether or not the host vehicle can move forward by the lane change by a predetermined preceding distance with respect to the other vehicle by the time the host vehicle reaches the branch point by accelerating the host vehicle 102. CPU advances the present control to S120 when a negative determination is made, and advances the present control to S110 when an affirmative determination is made.

In S110, CPU notifies the routine of the lane change control by storing in RAM that the lane can be changed by accelerating the lane 110 of the lane change destination ahead of the other vehicle 112 traveling ahead of the lane change destination, and displays the notification on the indicator 52.

In S120, CPU displays on the indicator 52 that the driver is left to determine whether or not the lane can be changed forward or backward of the other vehicle 112 traveling ahead of the lane 110 of the lane change destination.

Lane Change Control

Figure 3:
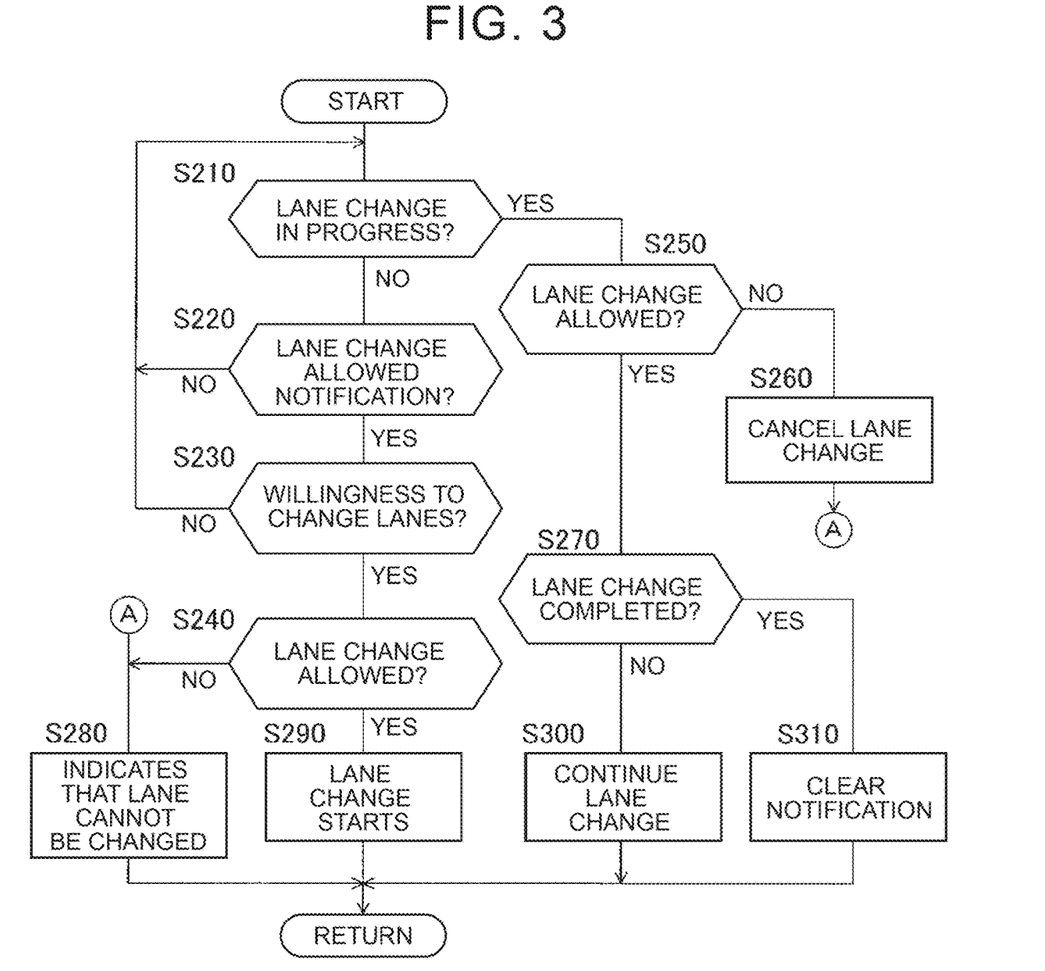
FIG. 3 is a flowchart corresponding to the lane change control program in the embodiment.

Next, the lane change control in the embodiment will be described with reference to the flowchart shown in FIG. 3. The lane change control according to the flow chart shown in FIG. 3 is repeatedly executed at predetermined intervals by CPU of the driving support ECU 10 when the lane change assistance switch is on and RAM stores that the lane can be changed.

First, in S210, CPU determines whether or not the host vehicle 102 is changing the lane. CPU advances the present control to S250 when an affirmative determination is made, and advances the present control to S220 when a negative determination is made. On the basis of the detection result of the target information acquisition device 18, it may be determined that the vehicle is changing the lane when the host vehicle 102 is moving in the lateral direction with respect to the lane and when it is determined that the first determination time (positive constant) has not elapsed since the movement in the lateral direction has ended.

In S220, CPU determines whether or not there is a notification indicating that the lane can be changed by determining whether or not the lane can be changed is stored in RAM. CPU returns the present control to S210 when a negative determination is made, and advances the present control to S230 when an affirmative determination is made.

In S230, CPU determines whether or not the driver intends to change the lane by determining whether or not the turn lever is tilted toward the lane changeable side. CPU returns the present control to S210 when a negative determination is made, and advances the present control to S240 when an affirmative determination is made. Whether or not the driver intends to change the lane may be determined based on the presence or absence of an operation of a button not shown in FIG. 1, a gesture of the driver, or the like.

In S240, CPU determines whether or not the lane can be changed by determining whether or not there is another vehicle or the like that is a failure of the lane change. CPU advances the present control to S280 when a negative determination is made, and advances the present control to S290 when an affirmative determination is made.

In S250, CPU determines whether or not lane change is enabled as in S240. When an affirmative determination is made, CPU advances the present control to S270, and when a negative determination is made, it stops the lane change in S260, and then advances the present control to S280.

In S270, CPU determines whether the lane change has been completed. When a negative determination is made, CPU advances the present control to S300, and then advances S210 to S250. When an affirmative determination is made, CPU advances the present control to S310. On the basis of the detection result of the target information acquisition device 18, it may be determined that the lane change has been completed when it is determined that the second determination time (positive constant) shorter than the first determination time has elapsed since the lateral movement of the host vehicle 102 has ended.

In S280, CPU displays on the indicator 52 that the lane change is not allowed. In S290, CPU outputs a lane change command signal to an EPS•ECU 40 or the like to start the lane change in a manner known in the art, and displays a message indicating that the lane change has started on the indicator 52.

In S300, CPU continuously executes the lane change in a manner known in the art by outputting a lane change command signal to a EPS•ECU 40 or the like, and displays on the indicator 52 that the lane change is continuing. In S310, CPU erases the memory indicating that the lane can be changed from RAM and displays the fact that the lane change has been completed on the indicator 52.

As can be seen from the above description, according to the embodiment, it is determined that the lane change needs to be performed. (S10) It is determined that the distance Lbp from the current position of the host vehicle 102 to the branch point Pbp is less than the reference distance Lbpc (S30). When it is determined that the inter-vehicle distance Lip is less than the reference inter-vehicle distance Lipc, the determination of step 60 is performed first. In S60, one of the first and second determinations corresponding to the above expressions (1) and (2) is performed.

The first determination is a determination as to whether or not the sum of the distance (Lip+Lif)/Vr*Vo traveled by the host vehicle 102 to move forward by the lane change by the predetermined preceding distance Lif with respect to the other vehicle 112 and the distance Ta*Vo traveled by the host vehicle during the predetermined allowance time Ta is equal to or less than the distance Lbp from the current position of the host vehicle to the branching point. The second determination is a determination of whether or not the sum of the time (Lip+Lif)/Vr, which is required for the vehicle to move forward by the lane change by the predetermined preceding distance to the other vehicle and the predetermined allowance time Ta is equal to or less than the time Lbp/Vo until the vehicle reaches the branching point.

Therefore, according to the embodiment, it is possible to determine whether or not the host vehicle 102 can change the lane ahead of the other vehicle 112 traveling ahead of the lane 110 of the lane change destination by the determination of S60. When an affirmative determination is made in S60, the indicator 52 indicates that the host vehicle 102 can change the lane without accelerating or decelerating toward the front of the other vehicle 112 in S70. Therefore, the driver can recognize that the vehicle can change the lane without accelerating or decelerating to the front of the other vehicle, and can reduce the possibility that the lane change is determined to be impossible even if the lane change to the front of the other vehicle is possible.

Further, according to the embodiment, an affirmative determination is made in S220 and S230, and if the lane can be changed, an affirmative determination is made in S240, and in S290, the lane change to the front of the other vehicle is started by autonomous driving without acceleration/deceleration. Further, the lane change is continued until the lane change is completed and an affirmative determination is made in S270. Therefore, it is possible to automatically change the lane of the host vehicle 102 to the front of the other vehicle 112.

Further, according to the embodiment, when a negative determination is made in S60, the determination in step 80 is performed. In S80, an allowable deceleration Gxp is calculated so that the host vehicle 102 moves backward by the lane change by a predetermined following distance Lib with respect to the other vehicle 112, and one of the third and fourth determinations corresponding to the above expressions (3) and (4) is performed, respectively.

The third determination is a determination as to whether or not the sum of the distance $Vr^2/(2Gxp)$ at which the host vehicle approaches the other vehicle by decelerating at an allowable deceleration Gxp by the host vehicle 102 until the relative speed Vr becomes zero and the predetermined following distance Lib is equal to or less than the inter-vehicle distance Lip between the host vehicle and the other vehicle. The fourth determination is a determination as to whether or not the sum of the half Vr/(2Gxp) of the time required for the host vehicle to decelerate at an allowable deceleration Gxp so that the relative speed Vr reaches zero and the time Lib/Vr required for the host vehicle to travel a predetermined following distance Lib is equal to or less than the time Lip/Vr required for the host vehicle to catch up with another vehicle.

Therefore, according to the embodiment, it is possible to determine whether or not the host vehicle 102 can change the lane by decelerating to the rear of the other vehicle 112 traveling ahead of the lane 110 of the lane change destination, based on the determination of S80. When an affirmative determination is made in S80, the indicator 52 indicates that the host vehicle 102 can decelerate to the rear of the other vehicle 112 and change the lane in S90. Therefore, the driver can recognize that the vehicle can change the lane by decelerating to the rear of the other vehicle, and can reduce the possibility that the lane change is determined to be impossible even if the lane change to the rear of the other vehicle is possible.

Further, according to the embodiment, an affirmative determination is made in S220 and S230, an affirmative determination is made in S240 if the lane can be changed, and the lane change to the rear of the other vehicle is started in S290 by the autonomous driving in which the deceleration is performed. Further, the lane change is continued until the lane change is completed and an affirmative determination is made in S270. Therefore, the vehicle can be automatically decelerated to the rear of the other vehicle to change the lane.

Further, according to the embodiment, when a negative determination is made in S80, the determination in step 100 is performed. In S100, a fifth determination is made as to whether or not the host vehicle can move forward by lane change by a predetermined preceding distance with respect to the other vehicle by accelerating the host vehicle 102 until the host vehicle reaches a branch point.

Therefore, according to the embodiment, it is possible to determine whether or not the host vehicle 102 can be accelerated ahead of the other vehicle 112 traveling ahead of the lane 110 of the lane change destination by the determination of S100. Further, when an affirmative determination is made in S100, in S110, an indication that the host vehicle 102 can be accelerated to change the lane ahead of the other vehicle 112 is displayed on the indicator 52. Therefore, the driver can recognize that the vehicle can be accelerated to change the lane ahead of the other vehicle, and if the vehicle is accelerated, it is possible to reduce the possibility that the lane change is determined to be impossible even if the lane can be changed ahead of the other vehicle.

Further, according to the embodiment, an affirmative determination is made in S220 and S230, and if the lane can be changed, an affirmative determination is made in S240, so that the lane change to the front of another vehicle is started in S290 by the autonomous driving in which the acceleration is performed. Further, the lane change is continued until the lane change is completed and an affirmative determination is made in S270. Therefore, it is possible to automatically accelerate the own vehicle to the front of the other vehicle and change the lane.

Further, according to an embodiment, when a negative determination is made in S100, step 120 is performed. In S120, the indicator 52 displays a message indicating that the driver is left to determine whether or not the lane can be changed forward or backward of the other vehicle 112. Therefore, the driver can recognize that it is necessary to determine whether or not the lane can be changed forward or backward of the other vehicle 112.

Since a negative determination is made in S220, the lane is not changed by autonomous driving. Therefore, it is possible to avoid an unreasonable lane change by the automatic driving.

Figure 4:
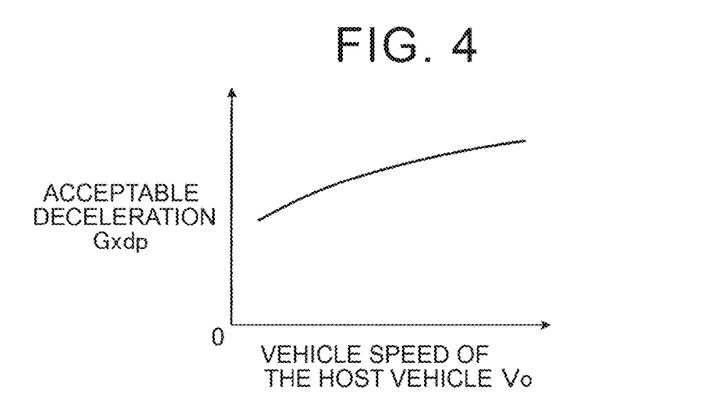
FIG. 4 is a diagram illustrating a map for calculating an allowable deceleration Gxp based on vehicle speed Vo of the host vehicle.

Further, according to the embodiment, the deceleration Gxp that can be allowed for the host vehicle 102 to move backward by the lane change by a predetermined following distance with respect to the other vehicle 112 is calculated from the map shown in FIG. 4 based on the vehicle speed Vo of the host vehicle. Therefore, it is possible to appropriately determine whether or not the lane can be changed by decelerating to the rear of the other vehicle 112 prior to reaching the branching point of the lane, as compared to when the allowable deceleration Gxp is constant regardless of the vehicle speed Vo of the host vehicle.

The present disclosure has been described in detail above with respect to specific embodiments. However, it is obvious to those skilled in the art that the present disclosure is not limited to the above-described embodiments, and various other embodiments are possible within the scope of the present disclosure.

For example, in the above-described embodiment, one of the first and second determinations is performed in S60. When one of the first and second determinations is a negative determination, one of the third and fourth determinations is performed in S80. When one of the third determination and the fourth determination is a negative determination, the fifth determination is performed in S100. However, first, one of the third and fourth determinations may be performed, and when the one of the third and fourth determinations is a negative determination, one of the first and second determinations may be performed, and when the one of the third and fourth determinations is a negative determination, the fifth may be performed.

In the above-described embodiment, in S60, one of the first and second determinations, which is a determination as to whether or not the above-described Expressions (1) and (2) are satisfied, is performed. The expressions (1) and (2) may be replaced with, for example, the following expressions (5) and (6), respectively. In Expression (5) below, La is Ta*Vo, and in Expression (6) below and Expressions (7) and (8) below, Tr is Lip/Vr.

$$(Lip + Lif)/Vr * Vo + La \le Lbp \quad (5)$$

$$(Lif/Vr + Tr + Ta) * Vo \le Lbp \quad (6)$$

In the above-described embodiment, in S80, one of the third and fourth determinations is performed, each of which is a determination of whether or not the above-described expressions (3) and (4) are satisfied. The expressions (3) and (4) may be replaced with, for example, the following expressions (7) and (8), respectively.

$$Vr^2/(2Gxp) + Lib \le Tr * Vr \qquad (7)$$

$$Vr/(2Gxp) + Lib/Vr \le Tr \qquad (8)$$

Further, in the above-described embodiment, the inter-vehicle distance is a distance along the lane between the front ends of the two vehicles. However, the inter-vehicle distance Lpr in the determination of S40 may be a distance Lipfe between the front end of the host vehicle 102 and the rear end of the other vehicle 112 traveling ahead of the lane 110 of the lane change destination based on the information from the target information acquisition device 18. In such cases, the reference vehicle-to-vehicle distance may be Lprc−Lpv, taking as an Lpv the length of the other vehicle 112 estimated based on the information from the target information acquisition device 18.

In addition, the inter-vehicle distance Lip in the above expression (1) or the like may be replaced with the distance Lipfe, and the predetermined preceding distance Lif in the above expression (1) or the like may be replaced with the distance between the front end of the other vehicle 112 and the rear end of the own vehicle plus the front-rear length of the own vehicle.

Similarly, the predetermined following distance Lib in the above expression (3) or the like may be replaced by the sum Lipfe+Lpv of the distance Lipfe between the front end of the host vehicle 102 and the rear end of the other vehicle 112 and the length of the other vehicle 112 with Lpv.

Further, in the above-described embodiment, when it is determined that the lane change is possible by the lane change mode determination according to the flowchart shown in FIG. 2, the lane change by the automatic driving is performed by the lane change control according to the flowchart shown in FIG. 3. However, the lane change control according to the flowchart illustrated in FIG. 3 may be omitted.

What is claimed is:

1. A lane change support device comprising: a target information acquisition device that acquires information on a target around a host vehicle;
a vehicle speed information acquisition device that acquires information on a vehicle speed of the host vehicle;
and a control unit configured to estimate an inter-vehicle distance between the host vehicle and another vehicle traveling ahead in a lane as a lane change destination and a relative vehicle speed of the host vehicle with respect to the other vehicle based on the information acquired by the target information acquisition device, wherein the control unit is configured to
acquire information on a distance from a present location of the host vehicle to a branching point of a lane,
and determine whether the host vehicle is able to make a lane change to a location ahead of the other vehicle by making one of a first determination and a second determination based on the vehicle speed of the host vehicle, the inter-vehicle distance, the relative vehicle speed, and the distance from the present location of the host vehicle to the branching point of the lane, the first determination being a determination as to whether a sum of a distance to be traveled by the host vehicle to make a lane change and move to a location a predetermined preceding distance ahead of the other vehicle and a distance to be traveled by the host vehicle during a predetermined allowance time is equal to or less than a distance from the present location of the host vehicle to the branching point, and the second determination being a determination as to whether a sum of a time for the host vehicle to make a lane change and move to a location the predetermined preceding distance ahead of the other vehicle and a predetermined allowance time is equal to or less than a time for the host vehicle to reach the branching point.

2. The lane change support device according to claim 1, wherein the control unit is configured to, when a negative determination is made in the one of the first and second determinations,
specify deceleration that is allowable for the host vehicle to make a lane change and move to a location a predetermined following distance behind the other vehicle,
and determine whether the host vehicle is able to make a lane change to a location behind the other vehicle by making one of a third determination and a fourth determination, the third determination being a determination as to whether a sum of a distance by which the host vehicle approaches the other vehicle before the relative vehicle speed becomes zero by the host vehicle decelerating at the allowable deceleration and the predetermined following distance is equal to or less than the inter-vehicle distance, and the fourth determination being a determination as to whether a sum of half a time before the relative vehicle speed becomes zero by the host vehicle decelerating at the allowable deceleration and a time required for the host vehicle to travel the predetermined following distance is equal to or less than a time for the host vehicle to catch up with the other vehicle.

3. The lane change support device according to claim 2, wherein the control unit is configured to, when a negative determination is made in the one of the third and fourth determinations, make a fifth determination that is a determination as to whether the host vehicle is able to make a lane change and move to a location the predetermined preceding distance ahead of the other vehicle before the host vehicle reaches the branching point by accelerating the host vehicle.

4. The lane change support device according to claim 3, wherein the control unit is configured to, when a negative determination is made in the fifth determination, leave to a driver a determination as to whether the host vehicle is able to make a lane change and move to a location ahead of the other vehicle.

5. The lane change support device according to claim 2, wherein the control unit is configured to specify the allowable deceleration according to the vehicle speed of the host vehicle.

* * * * *